June 5, 1951 | H. ROMANDER | 2,555,373

OSCILLATOR

Filed June 2, 1947

INVENTOR.
HUGO ROMANDER

BY Percy P. Lantzy

ATTORNEY

Patented June 5, 1951 2,555,373

UNITED STATES PATENT OFFICE 2,555,373

OSCILLATOR

Hugo Romander, Redwood City, Calif., assignor to Federal Telephone and Radio Corporation, New York, N. Y., a corporation of Delaware Application June 2, 1947, Serial No. 751,713

11 Claims. (Cl. 250—36)

This invention relates to signal-controlled oscillators and more particularly to such oscillators arranged to have their frequency varied or shifted under control of signals.

A principal object of the invention relates to an improved self-excited oscillator of the grid-controlled type, which is arranged to have its frequency shifted to predetermined extents on opposite sides of a center frequency, under control of signals.

Another principal object is to provide an improved oscillator for use in carrier frequency shift systems.

Another object is to provide an oscillator generator of the self-excited type which is arranged to have its frequency shifted under control of signals, and wherein the average mean or center frequency has a high order of stability which is substantially independent of ambient changes in the various D. C. operating voltages such as a plate voltage, grid bias voltage, screen voltage, heater voltage, and the like.

A further object relates to an improved frequency-shift oscillator of the self-excited and phase shift controlled type.

A feature of the invention relates to an arrangement employing a pair of grid-controlled tubes which are provided with respective self-excitation circuits each including a phase shift network of mutually different phase-shift characteristics, together with means for varying the transconductance of the tubes under control of signals, to vary the generated frequency.

Another feature relates to a carrier frequency shift oscillator employing a pair of similar multi-grid tubes having their plates or output anodes connected in like phase to one terminal of the oscillatory tank circuit, the opposite end of the tank circuit being returned in parallel to the control grids of the tubes but through respective phase-shifting networks of substantially equal and opposite phase-shift powers. The signal voltages are impressed upon injection grids in the respective tubes to vary their respective transconductances and thereby to vary the oscillator frequency.

A still further feature relates to the novel organization, proportioning and interconnection of parts for providing an improved frequency-shift oscillator.

In the drawing which shows one embodiment,

Figure 1:
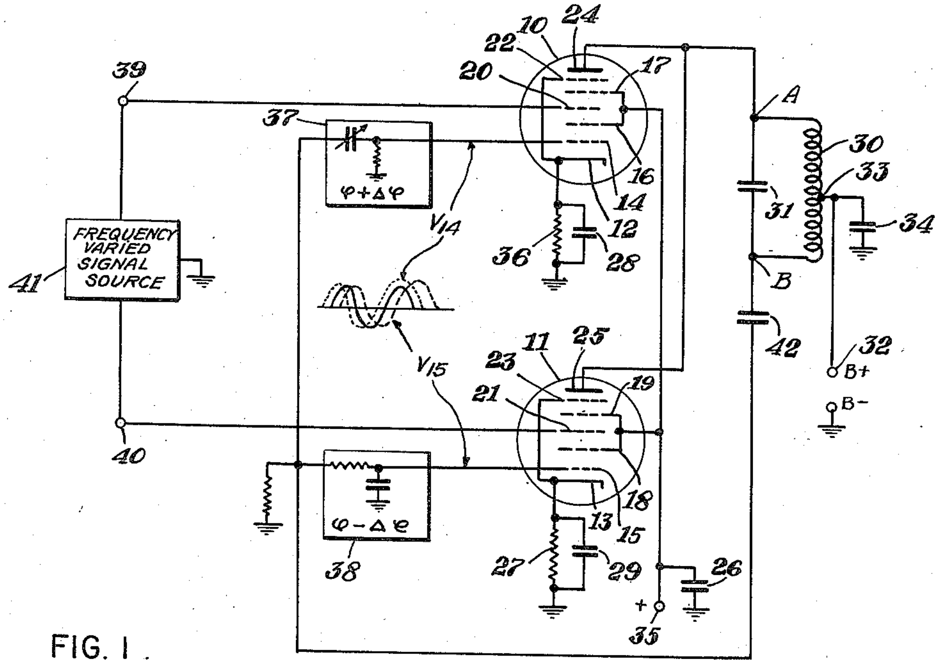
Fig. 1 is a generalized composite schematic wiring and block diagram of a shiftable frequency oscillator according to the invention.

Referring to the drawing, there are shown two grid-controlled electron tubes 10, 11, preferably of the same tube type and construction so as to have as nearly as possible identical operating characteristics. Preferably, although not necessarily, tubes 10, 11, are of the multi-grid type e. g., so-called pentagrid tubes each comprising an evacuated envelope containing an electron-emitting cathode 12, 13; a first control grid 14, 15; interconnected shield grids 16—17, and 18—19; a second control or injection grid 20, 21; suppressor grid 22, 23; and plate or output anode 24, 25. In the usual way, the suppressor grids are returned directly to their respective cathodes and the latter are positively biased with respect to ground and therefor with respect to their associated first control grids 14, 15, in any well-known manner, for example by the cathode bias resistors 26, 27, and their convention by-pass condensers 28, 29. Preferably, and in accordance with the invention, grids 14, 15, are negatively biased so that in the absence of signal voltages applied to grids 20, 21, the oscillator generates at its center frequency.

The plates 24, 25, are connected in like phase to the terminal A of a tuned oscillatory or tank circuit comprising inductance 30 and shunt tuning condenser 31. The D. C. operating voltage for plates 24, 25, is supplied from the +B terminal 32, of any well-known plate power supply, thence through a tap 33 on coil 30. The usual high frequency by-pass condenser 34 is provided around the D. C. plate supply and connected to the tap 33 so as to provide a radio frequency ground return for the plate circuit. Likewise, the shield grids of the tubes are supplied with the usual and appropriate D. C. voltage from a suitable terminal 35 of the plate power supply. The usual high-frequency-to-ground by-pass condenser 36 is provided for the screen grids.

Figure 2:
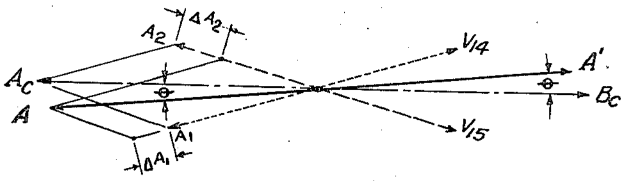
Fig. 2 is a vector diagram explanatory of the operation of Fig. 1.

The opposite terminal B of the tank circuit is connected in parallel to the control grids 14, 15, through respective phase-shift networks 37, 38, of any well-known design, the losses in networks 37 and 38 being substantially equal so that the excitations at each grid are equal in amplitude. In accordance with the invention, networks 37, 38, are designed so that when an alternating voltage exists between point B and ground, at the natural or resonant frequency of the tank circuit 30—31, the feedback voltage at grids 14, 15, are of equal amplitude but of different respective phases. In accordance with well-known principles, the tubes 10 and 11 act as self-excited oscillators. However, in accordance with the invention, the network 37 is designed so that the phase of the feedback voltage at grid 14 leads the voltage at point B by a small angle e. g., 30° as represented by the dashed line graph $V_{14}$ and by vector $V_{14}$ (Fig. 2). Likewise, the network 38 is designed so that the phase of the feedback voltage at grid 15 is retarded with respect to the voltage at point B by an equal angle of 30°, as represented by the dotted graph $V_{15}$ and the vector $V_{15}$ (Fig. 2).

It is one of the characteristics of a self-excited oscillator of the grid-controlled type, that the oscillator will always oscillate at a frequency which satisfies the requirement that the internally generated A. C. voltage in the plate circuit shall be exactly 180° out of phase with respect to the grid-to-cathode A. C. voltage. This is represented by the respective vectors $B_c$ and $A_c$ (Fig. 2). In the above assumed example, since tubes 10 and 11 have the same transconductance, the internally generated plate circuit voltage $A_1$ (Fig. 2) at terminal A resulting from the action of tube 10, leads by 30°, and the corresponding voltage $A_2$ at point A resulting from tube 11, lags by 30°. The actual voltage therefore at the common point A is the resultant $A_c$.

In the well-known manner, the injection grids 20, 21, have the property, when they have their bias changed with respect to their cathode, of controlling the transconductances of the respective tubes. Thus, a change in the negative bias on either of the grids 20, 21, will contribute to a corresponding change in the net plate voltage at point A. A decrease in negative bias on grid 20, and a corresponding increase in the negative bias on grid 21, will permit tube 10 to predominate over tube 11 in the oscillating system, producing a negative change $A_2$ (Fig. 2) at point A from tube 11, and a positive change $A_1$ from tube 10. The resultant of these will be the vector A. This represents a phase angle change in the center frequency $\theta$. Consequently the oscillating system will, perforce, shift to a lower frequency in order that the tank circuit may then present a lagging power factor impedance, and thus cause a shift in the external plate voltage $B_c$ (Fig. 2) with respect to A' to counteract the leading phase shift of network 37. The net result is that the oscillaor changes its actual generating frequency. The effect just described takes place in more or less degree according to the relative changes in transconductance of the tubes 10, 11. By the same reasoning, it follows that an increase in negative bias on grid 20, accompanied by a corresponding decrease in negative bias on grid 21, will cause a frequency shift in the generated frequency toward a frequency higher than the center frequency $A_c$. In practice, it has been found that by properly selecting the bias applied to the grids 14 and 15, and grids 20, 21, it is possible to obtain a linear variation in the generated frequency when the voltages on grids 20 and 21 are changed equal amounts in push-pull manner about the mean bias point.

The oscillator generator shown in Fig. 1 is particularly useful in so-called carrier frequency shift transmission systems, for example in telegraph transmission where the mark and space signal are represented respectively by D. C. potentials, these signal potentials being applied to the terminals 39, 40, connected to the signal source 41.

The networks 37 and 38 may be of any conventional type. If, however, these networks are D. C. conductive, it is necessary to employ a separate D. C. blocking condenser such as condenser 42, for this purpose. While the tubes 10 and 11 are shown as biased by the well-known cathode bias resistor, it will be understood that the grids may be biased by a separate source of bias supply or in any other manner well-known in the electron tube art. Furthermore, while the coil 30 is grounded for radio frequency by the tap 33 and condenser 34, it will be understood that any other equivalent radio frequency grounding arrangement may be employed. For example, the condenser 31 may be replaced by two suitable condensers connected in series between the points A and B and the common connection between these condensers can be returned to ground in the usual way.

It has been found that an oscillator generator such as described has a very high order of center frequency stability. Consequently, changes in plate voltage effect both tubes 10, 11 equally, and since the effect of the two tubes is opposite, any such change in voltage results in a negligible frequency change. Likewise, a change in filament voltage, screen voltage or normal bias voltage on the various grids does not result in any substantial change in the center frequency.

While the drawing shows tubes of the multigrid type, it will be understood that they may be replaced by triodes in which event the signals from the source 41 are applied to the control grids in any suitable way to vary their mean bias.

It will be understood of course, that the invention is not limited to any particular design of phase-shifting network. Any of the methods of shifting of the phases as above described, may be employed.

While in the foregoing, reference has been made to the use of the oscillator for frequency shift transmission, it will be understood that the expression "frequency shift" is used in its generic sense to include a shifting of the generated frequency from a normal or reference frequency at one end of the range, to a frequency at the opposite end of the range, or a shift on opposite sides of a mean or base frequency, as well as frequency modulation. Thus, in the case of telegraph transmission when a space signal is being transmitted, the oscillator may generate at a frequency of 200 kc., and when a mark signal is being transmitted, it will oscillate at a frequency (200 kc.$+n$). On the other hand, the system may be arranged so that normally it generates a 200 kc. frequency, and when a space signal is being transmitted, the oscillator will generate at a frequency (200 kc.$-n$), and when a telegraph mark signal is being transmitted, it will oscillate at a frequency (200 kc.$+n$). It will also be understood that instead of using D. C. or telegraph signals to excite the injected grids 20 and 21, voice frequency or corresponding variable amplitude signals may be applied to these grids to produce so-called frequency modulations in the generated output of the tubes 10, 11.

In the case of ordinary telegraph signals, they may be either polarized or unidirectional, and by suitable phase inverter circuits well-known in the art, these telegraph signals can be applied in push-pull relation to the injector grids 20, 21. Instead of employing polarized or unidirectional impulses to excite the grids 20 and 21, the original D. C. signals can first be converted into keyed tone signals in the manner well-known in the art, and these keyed tone signals can be applied respectively to the grids 20 and 21. It will be understood that the invention is not limited to a shifting of the frequency of the oscillator symmetrically about a mean frequency. While, under ordinary conditions of use, the oscillator may for example by a 200 kilocycle oscillator which is shifted by simply increasing the transconductance of one of the tubes while decreasing it on the other, it is not necessary that the signals to be transmitted produce symmetrical changes in bias on the injector grids 20, 21, about a mean value. For example, under certain conditions, it may be desirable to shift the oscillator unsymmetrically about a preselected reference frequency. This can be easily accomplished in the system as disclosed by causing the signals applied to the grids 20 and 21 to effect a bias on one injector grid to a greater extent than the other with respect to some preselected base bias value.

Various changes and modifications may be made therein without departing from the spirit and scope of the invention.

What is claimed is:

1. A signal-controlled shiftable frequency oscillation generator comprising a pair of grid-controlled electron tubes, a tuned oscillatory circuit, means connecting one terminal of said circuit in like phase to the anodes of said tubes, means connecting the opposite terminal of said circuit to the control grids of said tubes in mutually different phases, and means to bias said grids so that normally the phase of the feedback voltage applied to the grid of one tube leads the phase of the voltage at said opposite terminal, while the phase of the feedback voltage applied to the grid of the other tube lags the phase of the voltage at said opposite terminal.

2. A signal-controlled oscillation generator according to claim 1 in which the said phase lead and the said phase lag are equal in amount.

3. A signal controlled oscillation generator according to claim 1 in which the said phase lead and the said phase lag are of the same amount but substantially less than 90°.

4. A signal-controlled oscillation generator according to claim 1 in which each of said tubes has its grid connected to a source of signal voltage for correspondingly and oppositely varying the respective transconductances of said tubes and thereby varying the frequency of the generated oscillations.

5. A signal-controlled oscillation generator according to claim 1 in which each of said tubes is of the multi-grid type each having in addition to said control grid an injection grid for varying the tube's transconductance in response to impressed signals and thereby to vary the frequency of the generated oscillations.

6. An oscillation generator of the self-excited type, comprising a pair of grid-controlled oscillator tubes, a tank circuit having one terminal connected in like phase to the anodes of said tubes, means for connecting the opposite terminal of said tank circuit to the grids of said tubes over separate feedback voltage paths, means to advance the phase of the feedback voltage applied to the grid of one tube, means to retard the phase of the feedback voltage applied to the grid of the other tube, a source of control signals, and means responsive to said control signals to vary the transconductances of the tubes and thereby to vary the frequency of the generated oscillations.

7. A generator according to claim 6 in which the grids of said tubes are excited in push-pull relation by said control signals.

8. A generator according to claim 6 in which said tank circuit has one end connected in like phase to the anodes of said tubes and the other end connected in parallel to said grids respectively through said phase-advancing and phase-retarding means.

9. A carrier shift oscillation generator comprising a pair of multi-grid electron tubes each having a cathode, an anode, a control grid and an injection grid, a tuned tank circuit having one terminal connected in like phase to the anodes of said tubes, a phase advancing network connected between the opposite terminal of said tank circuit and the control grid of one tube, a phase-retarding network connected between said opposite terminal of the tank circuit and the control grid of the other tube, means to bias the control grids and injection grids of said tubes so that normally said oscillator generates a predetermined center frequency, and means to apply control signals to the injection grids to vary the transconductances of said tubes and thereby to vary the frequency of the generated oscillations.

10. A carrier shift oscillation generator according to claim 9 in which means are provided for applying said control signals to the injection grids of said tubes in push-pull relation.

11. A self-excited oscillation generator, comprising two grid-controlled electron tubes having a common tank circuit, means for coupling energy from one terminal of said tank circuit in like phase to the anodes of said tubes, individual feedback paths coupled between the opposite terminal of said tank circuit and the grids of said tubes, each feedback path including a phase shifter one of which advances the phase of the feedback voltage and the other of which retards the phase of the feedback voltage, and signal control means to increase the transconductance of one tube while simutaneously decreasing the transconductance of the other tube and thereby to vary the frequency of the generated oscillations.

HUGO ROMANDER.

REFERENCES CITED

The following references are of record in the file of this patent:

UNITED STATES PATENTS

| Number | Name | Date |
|---|---|---|
| 2,159,237 | Usselman | May 23, 1939 |
| 2,165,229 | Crosby | July 11, 1939 |
| 2,326,314 | Usselman | Aug. 10, 1943 |